United States Patent
Schill et al.

(12) 
(10) Patent No.: US 6,751,267 B1
(45) Date of Patent: Jun. 15, 2004

(54) METHOD FOR REDUCING PEAK VALUES IN SINGLE-CARRIER MODULATED OR MULTI-CARRIER MODULATED DIGITAL TRANSMITTER SIGNALS

(75) Inventors: Dietmar Schill, Nürnberg (DE); Ernst Eberlein, Grossenseebach (DE); Heinz Gerhäuser, Waischenfeld (DE)

(73) Assignee: Fraunhofer-Gesellschaft zur Forderung der Angewandten Forschung E. V., Munich (DE)

( * ) Notice: Subject to any disclaimer, the term of this patent is extended or adjusted under 35 U.S.C. 154(b) by 0 days.

(21) Appl. No.: 09/623,722

(22) PCT Filed: Dec. 22, 1998

(86) PCT No.: PCT/EP98/08414

§ 371 (c)(1),
(2), (4) Date: Nov. 2, 2000

(87) PCT Pub. No.: WO99/45682

PCT Pub. Date: Sep. 10, 1999

(30) Foreign Application Priority Data

Mar. 3, 1998 (DE) .......................... 198 08 993

(51) Int. Cl.⁷ .......................... H04K 1/02; H04L 25/03; H04L 25/49
(52) U.S. Cl. .................... 375/296; 455/114.3
(58) Field of Search ................ 375/295, 296, 375/298, 284, 285, 278, 260, 261; 455/63.1, 114.3, 116, 117, 501, 67.3; 370/206, 207, 208

(56) References Cited

U.S. PATENT DOCUMENTS

| | | | |
|---|---|---|---|
| 5,268,938 A | 12/1993 | Feig et al. ............ | 375/122 |
| 5,287,387 A * | 2/1994 | Birchler ................ | 375/296 |
| 5,493,587 A * | 2/1996 | Sandri et al. .......... | 375/285 |
| 5,621,762 A * | 4/1997 | Miller et al. .......... | 375/298 |
| 5,638,403 A * | 6/1997 | Birchler et al. ........ | 375/296 |
| 5,727,026 A * | 3/1998 | Beukema ............... | 375/296 |
| 5,930,688 A * | 7/1999 | Floyd et al. ........... | 455/116 |
| 6,128,350 A * | 10/2000 | Shastri et al. ......... | 375/260 |
| 6,175,551 B1 * | 1/2001 | Awater et al. .......... | 370/210 |

FOREIGN PATENT DOCUMENTS

| | | | |
|---|---|---|---|
| DE | 19635813 | 9/1996 | ............ H04J/11/00 |
| EP | 735 731 | 10/1996 | ............ H04L/27/26 |

OTHER PUBLICATIONS

Shepard, S., J. Orriss, and S. Barton; Asymptotic Limits in Peak Envelope Power Reduction by Redundant Coding in Orthogonal Frequency—Division Multiplex Modulation; 1998; IEEE vol. 46, No. 1.

* cited by examiner

Primary Examiner—Phoung Phu
(74) Attorney, Agent, or Firm—Glenn Patent Group; Michael A. Glenn

(57) ABSTRACT

For reducing a peak value in single-carrier modulated or multi-carrier modulated digital transmitter signals, the peak value is first determined from a plurality of transmitter symbols contained in the digital signal. If a predetermined value is exceeded, a replacement symbol is generated which replaces a predetermined transmitter symbol. The replacement symbol is so chosen that it lowers the peak value and is convertible into the original transmitter symbol without error using a coding which was used to create the transmitter symbols.

7 Claims, 3 Drawing Sheets

METHOD FOR REDUCING PEAK VALUES IN SINGLE-CARRIER MODULATED OR MULTI-CARRIER MODULATED DIGITAL TRANSMITTER SIGNALS

BACKGROUND OF THE INVENTION

1. Field of the Invention

The present invention relates to a method for peak value reduction and in particular to methods for peak value reduction in single-carrier modulated digital transmitter signals and for peak value reduction in multi-carrier modulated digital transmitter signals.

2. Description of the Prior Art

In the transmission of digital transmitter signals the ratio of signal peak power to the average power of the transmitter signal, also called the crest factor, is of great interest. The crest factor is of particular importance for high-power amplifier output stages, such as those used in radio broadcasting. Every reduction in the crest factor results in an increase in the energy output and thus to reduced operating costs and purchase price for the amplifier output stage, since this can be operated with a smaller back-off, i.e. nearer to its optimal working point.

Methods for reducing a peak value are known from the prior art only for transmitter signals which have been modulated using multi-carrier modulation methods. Only the case of multi-carrier modulation using a fast Fourier transform (FFT) is referred to from the German patent application 19635813 entitled "Verfahren zur Reduktion des Spitzenwertfaktors bei digitalen Übertragungsverfahren".

Similar methods which are concerned with the reduction of the peak value factor in digital transmitter signals which have been modulated using multi-carrier modulation methods are known from e.g. M. Pauli and H.-P. Kuchenbecker "Reduzierung der durch Nichtlinearitäten hervorgerufenen Außerbandstrahlung bei einem Mehrträgerverfahren", ITG-Fachbericht 136 "Mobile Kommunikation", A. Jones, T. Wilkinson and S. Barton "Block coding schemes for reduction of peak to mean envelope power ratio of multi-carrier transmission schemes", Electronic Letters, December 1994, D. Wulich, "Reduction of peak to mean ratio of multi-carrier modulation using cyclic coding", Electronic Letters, February 1996, M. Friese "Multicarrier modulation with low peak-to-average power ratio", Electronic Letters, April 1996 and A. Kamerman and A. Krishnakumar "Reduction of peak to average power ratio for OFDM", European Patent Application No. 95306079.5 of Aug. 31, 1995.

The prior art cited above does not therefore disclose activities of any kind concerned explicitly with the reduction of the peak value in transmitter signals which have been modulated using one carrier or a plurality of carriers. In the so-called single-carrier method, i.e. a method in which the digital transmitter signal is modulated using one carrier, at most the modulation using offset quadrature phase shift keying (O-QPSK) can be regarded as an attempt at peak value reduction, but O-QPSK does not lead to a satisfactory reduction in the peak value.

The publication by S. Sheperd, J. Orriss and S. Barton, "Asymptotic Limits in Peak Envelope Power Reduction by Redundant Coding in Orthogonal Frequency-Division Multiplex Modulation", IEEE Transactions on Communications, vol. 46, no. 1, January 1998, pp. 5–10 contains a supposition concerning the asymptotic behaviour of the peak value reduction using a coding, but it is not possible to discover from this publication anything concerning the nature of such codes. Furthermore, this article does not contain any indication as to how such codes are to be constructed nor an example of such a code.

In addition reference is also made to the publication John G. Proakis "Digital Communications", 2nd edition 1989, McGraw-Hill, p. 532ff, which deals with digital transmission.

U.S. Pat. No. 5,621,762 describes a peak value suppression in which the digital data are mapped onto a constellation diagram to generate data symbols. In a scaling stage those symbols which would lead to the peak value being exceeded in a subsequent filter step in the transmit pulse filter are changed (distorted). Only those distortions of the output signal are allowed which lie within a circle of small radius around the original point, so that an error-free reconstitution of the transmitter signal can be achieved at the receiver. Consequently it is necessary to achieve an error-free reconstitution of the primary data, which leads to a severely restricted choice of possible output signal distortions.

EP 0 725 510 A relates to a method for reducing signal peak values in a transmission device. Symbols which cause the peak value to be exceeded are reduced by adding an adjusting symbol to the symbol to be sent so that the magnitude of the symbol to be sent is reduced. The adjusting symbol is generated by using subchannels which are not used for the data transmission. For the subchannels vectors are generated which are added to the symbol in such a way that, when an inverse Fourier transform is performed, the contributions of the added vectors, peak values of those subchannels which are used for data transmission, are reduced.

SUMMARY OF THE INVENTION

It is the object of the present invention to provide a method for peak value reduction in single-carrier modulated or multi-carrier modulated digital transmitter signals which enables an effective and substantial reduction of the peak value in the transmitter signals to be made in a simple way.

The present invention is a method for peak value reduction in single-carrier modulated digital transmitter signals, in which (a) on the basis of a plurality of transmitter symbols contained in the digital signal, the peak value from the plurality of transmitter symbols is determined, and (b) if the peak value which is determined exceeds a predetermined value, at least one replacement symbol is generated which replaces the transmitter symbol assigned to this peak value, the replacement symbol reducing the peak value and being convertible into the original transmitter symbol without error using a coding which was used to create the transmitter symbols, where the generated replacement symbol has a small Hamming distance to the original transmitter symbol and is opposed antipodally or in magnitude and phase to the peak value assigned to the original transmitter symbol.

The present invention is a method for peak value reduction in multi-carrier modulated digital transmitter signals, in which (a) the peak value taking account of at least one transmitter symbol for each carrier frequency is determined, and (b) if the peak value exceeds a predetermined value, a replacement symbol is generated which replaces the transmitter symbol assigned to this peak value, the replacement symbol reducing the peak value and being convertible into the original transmitter symbol without error using a coding which was used to create the transmitter symbols, where the generated replacement symbol has a small Hamming distance to the original transmitter symbol and is opposed antipodally or in magnitude and phase to the peak value assigned to the original transmitter symbol.

According to a preferred embodiment of the present invention the replacement symbol is generated by inserting a bit error into the transmitter symbol which is to be replaced.

According to a further preferred embodiment of the present invention an arbitrary point in the complex plane is chosen as the replacement symbol such that the replacement symbol when it is received and converted into a transmitter symbol has a small Hamming distance to the original transmitter symbol.

According to a further preferred embodiment of the present invention the multi-carrier signal for modulating the transmitter signal comprises less than 50 carriers, preferably 10 to 20 carriers.

An advantage of the present invention is that the method cited above requires no additional outlay at the receiver of the digital signal since the replacement symbol can be converted without error into the original transmitter symbol using a coding which was used to create the transmitter symbol. A further advantage of the present invention is that the redundancy which is provided can be apportioned effectively between the correction of errors caused by channel noise and peak value reduction.

Yet a further advantage is that only one encoder/decoder set is required.

Furthermore, an advantage of the present invention is that implementation of the method according to the present invention and in particular the decoding of the transmitter signal which is sent does not involve any signalling of information between the transmitter and the receiver concerning the replacement symbol.

Yet a further advantage of the present invention is that, both for the case where one carrier is used and that where a plurality of carriers is used, there is no need for a special code for generating the replacement symbols since the channel decoding performs this task quite naturally.

BRIEF DESCRIPTION OF THE DRAWINGS

Preferred embodiments of the present invention are described in more detail below making reference to the enclosed drawings, in which.

DESCRIPTION OF THE PREFERRED EMBODIMENTS

Figure 1:
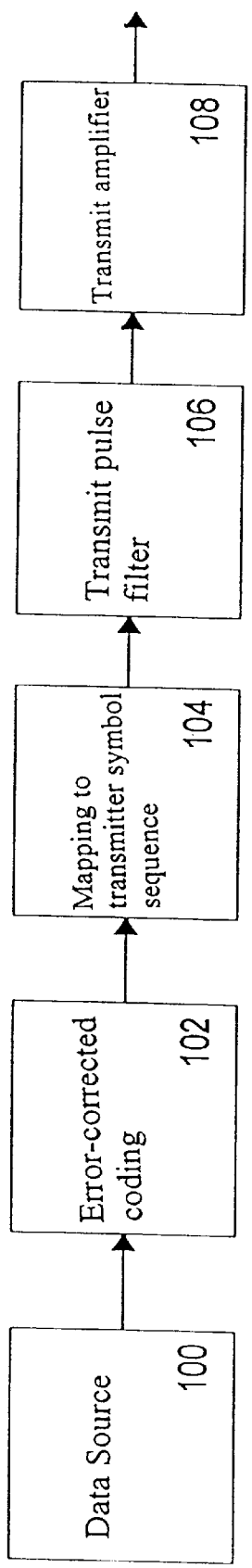
FIG. 1 shows a block diagram of a traditional digital single-carrier transmission path.

Before discussing preferred embodiments of the present invention in more detail, a traditional digital single-carrier transmission path will be described briefly in the light of FIG. 1. Concerning the description which follows it should be noted that in the drawings the same elements have the same reference numerals.

The single-carrier transmission path shown in FIG. 1 comprises a data source 100, whose output is connected to the input of a block 102, which performs an error-corrected coding of the signals received from the data source 100. The output of the block 102 is connected to the input of a block 104, which receives the coded signals from the block 102 and maps these onto a transmitter symbol sequence, resulting in a transmitter symbol sequence at the output of the block 104. This transmitter symbol sequence is fed into a transmit pulse filter 106, whose output signal is in turn fed into a transmit amplifier 108, which outputs the amplified signal and forwards it to the appropriate elements for transmission.

The classical or traditional block diagram (FIG. 1) of the transmit part of a digital transmission method with single-carrier modulation generates signals whose crest factor is decisively influenced by the transmit pulse shaping filter 106. This may e.g. take the form of a filter which is rectangular in the frequency domain, which results in a transmit pulse which is a SINx/x function in the time domain. Since this function only decreases in line with 1/x, the transmit pulses of a number of sequentially transmitted transmitter symbols overlap markedly and an "unfavourable" transmitter symbol sequence can lead to an additive overlapping of all these pulses, thus leading to a high peak value. This situation can be improved by using a better transmit pulse shaper 106. Frequently so-called "raised cosine filters" or "root raised cosine filters" are used for this purpose. In the case of the first cited filter, the transmit pulse falls off with the third power as a function of time, which markedly reduces the intersymbol interference and also the number of overlapping transmit pulses depending on the chosen roll-off factor, as is known from the publication John G. Proakis "Digital Communications", 2nd edition 1989, McGraw-Hill, p. 532ff. In practice it will be sufficient to restrict the number of overlapping single pulses to less than 10, and the number of transmitter symbols to be included can always for a transmission system be set to a constant value N, depending on the roll-off factor and the maximum desired reduction in the peak value or in the crest factor, to be described below.

The method according to the present invention in accordance with a first embodiment is described in more detail below in the light of FIG. 2. The elements already described in the light of FIG. 1 will not be described again. As can be seen from FIG. 2, firstly a peak value detector 110 and secondly a transmit pulse modification unit 112 are connected between the transmit pulse filter 106 and the transmit amplifer 108. The peak value detector 110 receives the output signal of the transmit pulse filter 106 and forwards the registered peak value to the transmit pulse modification unit 112, which, depending on the registered peak value, performs or does not perform a modification of the transmit pulse. From the transmit pulse modification unit 112 the signal is applied to the transmit amplifer 108.

According to an embodiment of the present invention a window of length N, which can e.g. be realized in the form of a shift register with N memory cells, is superimposed on the sequence of transmitter symbols present at the output of the transmit pulse filter 106. On the basis of the current N transmitter symbols the crest factor is calculated in the detector 110. The calculation is effected by determining the maximum peak value in the transmit sequence or the sequence of N transmitter symbols, and this value is subsequently divided by the effective value determined from the N symbols so as to obtain the desired crest factor. Following this it is checked whether the current transmit sequence, i.e. the current transmitter symbols, infringe, i.e. exceed, the crest factor specified as the maximum permissible. If this is not so, the "oldest" symbol, i.e. the symbol which is about to be forwarded to the transmit amplifier 108, is passed to the transmit amplifier 108 without reducing the crest factor, as also takes place in the example shown in FIG. 1. Then a new symbol is read into the window for registering the crest factor, once all the remaining values have been shifted one place.

If the detector calculates that the maximum permissible crest factor has been exceeded, the symbol which contributes most to the crest factor peak is modified. Although the situation in the embodiment described above is that the crest factor is registered and reduced, the present method is also applicable if just the peak value in the current transmitter symbol sequence is determined rather than the crest factor and that symbol which contributes most to the peak value is modified.

According to a first embodiment, modification of the symbols is achieved by deliberately inserting bit errors into the symbol so that a different valid code signal is sent. The bit inversion is so effected that the errored symbol lowers the peak value to the greatest possible degree. The replacement symbol which is to be sent preferably has the smallest possible Hamming distance to the original signal and at the same time has a peak value which is as nearly as possible opposed antipodally to the original signal's peak value so as reduce this to the greatest degree.

The higher the number of stages of the modulation involved, the easier it is to achieve this effect. This is particularly easy for a system which employs multi-level codes, since here the Euclidean distances between the points are large but differ only in respect of one bit. In contrast, it is particularly difficult to achieve this effect for a Gray coded system, since here the symbols with small Hamming distance lie close together.

Instead of the deliberate insertion of a bit error described above, the symbol can, according to a second embodiment, be so generated that a point or replacement symbol is sent which is not contained in the regular constellation, i.e. in the regular transmitter symbol sequence, but where the point or the replacement symbol has the following properties:

- in the receiver this replacement symbol is determined to be a symbol point which has the smallest possible Hamming distance to the symbol point which was originally to be sent. The replacement point or the replacement symbol lies within the determination domain of the symbol point with a small Hamming distance to the original symbol.
- the replacement symbol is maximally opposed in magnitude and phase to the detected peak value infringement and thus reduces this to the greatest possible degree.

The method of using intermediate constellation points which has just been described is of particular interest for low stage single-carrier methods, such as quadrature phase shift keying (QPSK), since the number of signal points available for correction here is very small.

Figure 2:
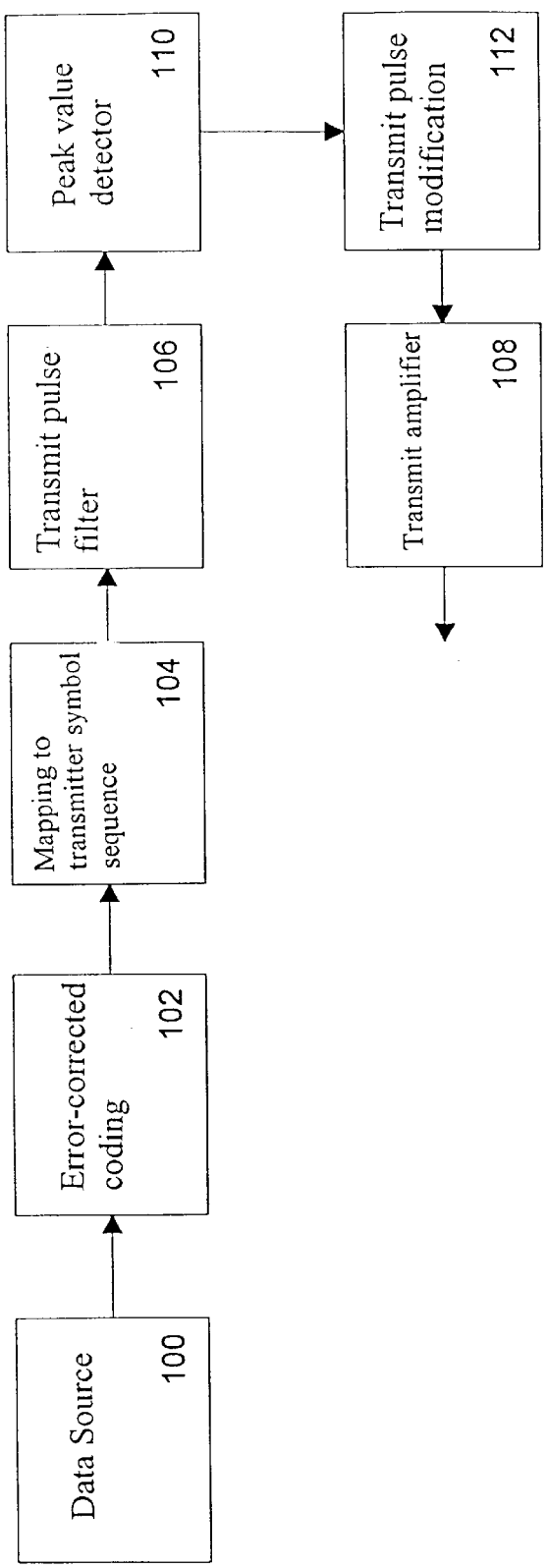
FIG. 2 shows a block diagram, an expanded version of that in FIG. 1, of a digital single-carrier transmission path for implementing the method according to the present invention.

In the case of the embodiment shown in FIG. 2, the symbol sequence within the processing window is modified progressively until the greatest permissible peak value or the greatest permissible crest factor is complied with. Then, as has already been described, the "oldest" symbol is sent, the remaining symbols are shifted one place, and a new symbol is incorporated into the processing.

As was explained above, this algorithm deliberately introduces errors (directly or indirectly) into the digital transmitter signal. These errors can be eliminated again in a receiver with the aid of the error-corrected codes which were used for coding the transmitter signal in block 102.

According to a further embodiment it may be desirable to exclude only the very largest peak values or crest factors.

In this case the peak value detector 110 is realized with the aid of a table in which unwanted transmitter symbol sequences are stored. Each of the unwanted transmitter symbol sequences has a precalculated replacement sequence assigned to it which is then sent in the place of the unwanted transmitter symbol.

Figure 3:
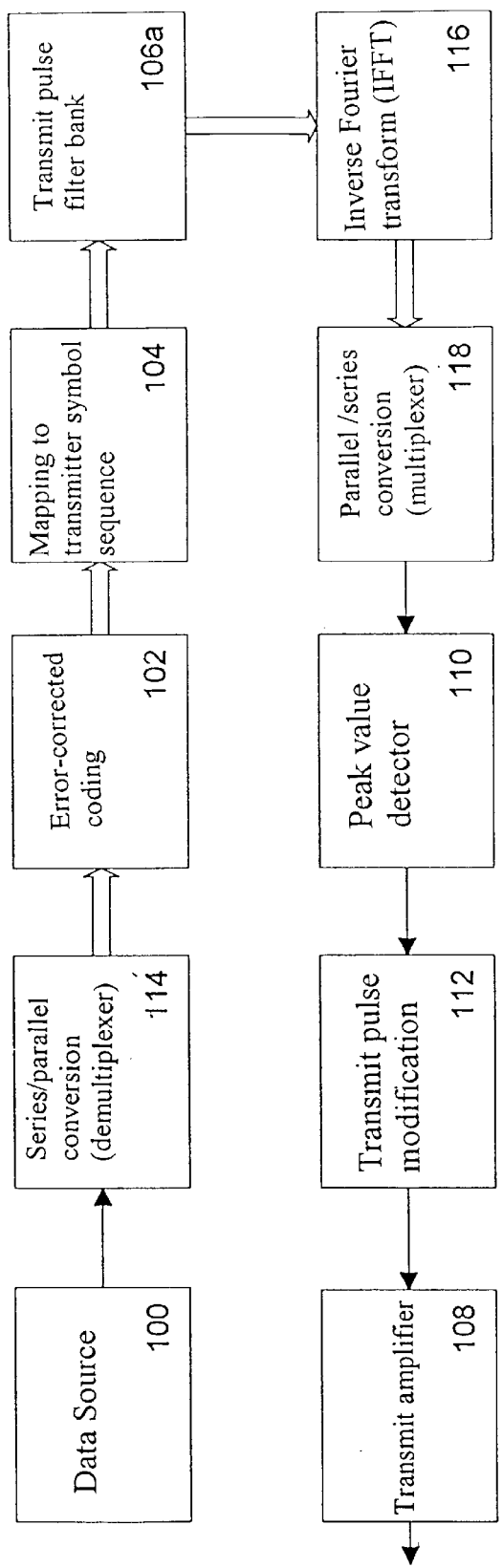
FIG. 3 shows an expanded digital multi-carrier transmission path for implementing the method according to the present invention in accordance with a further embodiment.

A further embodiment of the method according to the present invention is described in more detail below in the light of FIG. 3. The elements already described will not be described again. These elements are labelled with the same reference numerals as in FIG. 1 and FIG. 2. The block diagram described with reference to FIG. 3 is intended for use with a method where the modulation method employed is not a pure single-carrier modulation but where the information is transmitted in parallel over a plurality of channels in a frequency multiplex scheme. In addition to the blocks already described, there is a block for series/parallel conversion (demultiplexer) 114 between the data source 100 and the coding block 102. Instead of the transmit pulse filter 106 of FIG. 1 and 2 there is now a transmit pulse filter bank 106*a* in the embodiment shown in FIG. 3. Between the transmit pulse filter bank 106*a* and the peak value detector 110 there is a block 116 which performs an inverse fast Fourier transform (IFFT). The output of the block 116 is connected to the input of a parallel/series converter (multiplexer) 118 whose output is in turn connected to the input of the peak value detector 110.

For the embodiment shown in FIG. 3 the effect produced by the temporal superposition of the frequency-separated information subsequences becomes dominant for the crest factor. This means that the shift register, which contains the symbol sequence of a single carrier, can be made considerably shorter than for pure single-carrier modulation. According to one embodiment it is sufficient for the shift register to have just a single transmitter symbol.

If the system uses e.g. M carriers in frequency multiplex operation, only M shift registers have to be manipulated in parallel. According to one preferred embodiment the method described with reference to FIG. 3 employs a moderate number of carriers, the number M of the carriers in this method being less than 50 and preferably lying in the range between 10 and 20 carriers. As in the case of single-carrier modulation, the peak value detector 110 undertakes the detection of large peak values. If such a value is detected, the carriers with the dominant components can, for a moderate number (M<=50) of carriers, be determined efficiently by computation and, as in the case of single-carrier modulation, these can be compensated by inserting bit errors or by using intermediate constellation points. The insertion of bit errors and the use of intermediate constellation points has already been described above in the light of FIG. 2. It should be noted that the IFFT block 116 in the embodiment shown in FIG. 3 is optional, but in practice it is preferably employed on the grounds of simple implementability.

As is clear from the above description of the preferred embodiments of the present invention, no statement is made concerning the error-correction codes which are employed (block 102), and the block 102 accordingly leaves the options open. In fact the nature of the error-correction codes which are employed is not important for the present invention since the use of the methods according to the present invention does not depend on the error-correction codes which are employed.

What is claimed is:

1. A method for peak value reduction in single-carrier modulated digital transmitter signals, comprising the following steps:

a) on the basis of a plurality of transmitter symbols contained in the digital signal, determining the peak value from the plurality of transmitter symbols; and b) if the peak value which is determined exceeds a predetermined value, generating at least one replacement symbol which replaces the transmitter symbol assigned to this peak value, the replacement symbol reducing the peak value and being convertible into the original transmitter symbol without error using a coding which was used to create the transmitter symbols;

where the generated replacement symbol has a small Hamming distance to the original transmitter symbol and is opposed antipodally or in magnitude and phase to the peak value assigned to the original transmitter symbol.

2. A method according to claim 1, wherein the replacement symbol is generated by inserting a bit error into the transmitter symbol which is to be replaced.

3. A method according to claim 1, wherein an arbitrary point in the complex plane is chosen as the replacement symbol such that the replacement symbol when it is received and converted into a transmitter symbol has a small Hamming distance to the original transmitter symbol.

4. A method according to claim 1, wherein the steps a) and b) are repeated until the peak value for the plurality of transmitter symbols no longer exceeds the predetermined value.

5. A method according to claim 4, with the following steps:

c) sending the first symbol from the plurality of transmitter symbols;

d) incorporating a new transmitter symbol into the plurality of transmitter symbols to generate a new sequence of transmitter symbols; and e) performing the steps a) and b) for the new sequence of transmitter symbols.

6. A method according to claim 1, wherein the first, unmodified transmitter symbol is sent if no exceeding of the peak value is determined in step a).

7. A method according to claim 1, wherein in step b) the replacement symbol is read out of a table which contains unwanted transmitter symbols and the precalculated replacement symbols assigned to them.

* * * * *